Figure 1:
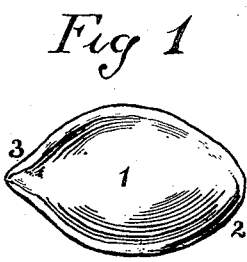

C. ELLIS.
COMPOSITION FOR ERADICATING RODENTS.
APPLICATION FILED NOV. 7, 1907.

944,419.

Patented Dec. 28, 1909.

Witnesses
W J Houghton
A. M. Houghton

Inventor
Carleton Ellis,
By K. P. McElroy
Attorney

UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

COMPOSITION FOR ERADICATING RODENTS.

944,419.      Specification of Letters Patent.      Patented Dec. 28, 1909.

Application filed November 7, 1907. Serial No. 401,083.

*To all whom it may concern:*

Be it known that I, CARLETON ELLIS, a citizen of the United States, residing at Larchmont, in the county of Westchester and State of New York, have invented certain new and useful Improvements in Composition for Eradicating Rodents, of which the following is a specification.

This invention relates to rat destroyers comprising materials substantially non-poisonous to human beings while having a positive and specific toxic action on rodents. The common forms of rat destroyers involve the use of strong and dangerous poisons such as phosphorus, arsenic and strychnine. Red phosphorus, while an active poison for rats, is liable to become ignited and set fire to buildings. This danger of spontaneous combustion is greatly increased by the presence in many of the rat poisons containing this element of bodies which have a tendency, in the course of time, to convert the red phosphorus into the highly inflammable yellow phosphorus. Probably a large number of conflagrations, the causes of which are unknown and which are perhaps attributed to defective electric wiring and the like, are caused by the use of phosphorus-containing rat poisons which may perhaps have been carried by rodents to remote parts of the building and eventually have become ignited. The use of arsenic is also beset with grave danger in view of the fact that it may be carried to all parts of a building by the rodents and may subsequently become reduced, giving rise to arsine gas and other arseniferous bodies of a volatile character, the presence of which in the air is extremely deleterious to human beings. Besides this the dust of the rooms may become more or less mixed with the arsenical material and this arsenic-laden dust may be inhaled to the great injury of the inmates of the building. Strychnine is so powerful a poison and so rapid in its toxic action that it is now generally condemned.

My improved composition comprises in the specific embodiment at present preferred oxid of zinc and barium carbonate in combination with organic material such as casein. These compounds coöperate to produce an extremely efficient composition. A suitable composition may be prepared in accordance with the following illustrative specific formula, it being understood that the proportions of the same may be substantially varied without departing from the scope of this invention.

| | |
|---|---|
| Barium carbonate | 100 lbs. |
| Zinc oxid | 50 " |
| Pulverized sugar | 75 " |
| Corn meal | 150 " |
| Powdered commercial casein | 50 " |
| Ground nutmeg | 2 " |
| Molasses | 50 " |

The dry materials are intimately mixed, then the molasses is added and when the latter has been well incorporated five gallons of water are introduced and well stirred in. A plastic mass is thus produced which preferably is rolled into sheets about 1/8 of an inch in thickness and is then cut into small elliptical tablets or cakes about the size and shape or general outline of a squash seed.

In the foregoing formula, the barium carbonate and zinc oxid serve as the toxic materials, while the other ingredients in addition to serving as sapid food materials, act as binders for the mineral matters. Casein is particularly well adapted as an ingredient since it is not only a very efficient binder, in this case probably combining chemically more or less with the zinc oxid and baryta of the barium carbonate, but is also a proteid food material. Rats are particularly fond of proteids. In this composition, the casein acts to bind the mass into a coherent whole, containing the toxic mineral matters intimately admixed and uniformly distributed therethrough. The sugar and molasses also act as efficient binding and are of course sapid food materials, particularly attractive to rats, and acting as baiting materials.

The proportion of barium carbonate and zinc oxid may be increased when it is desired to destroy rodents of large size, and for treatment in open places such as wharves, etc., it is of course possible to add arsenic; from one to three per cent. of white arsenic in conjunction with the zinc and barium compounds giving a composition generally sufficient to destroy even the largest rodents. I prefer however, for the reasons above stated, to use no highly poisonous material in my composition and I find the combination of zinc and barium compounds, as in the form of their oxids or carbonates, to be highly efficient. The action of these materials is sufficiently slow so that the poisoned rodent has opportunity to leave the building, and as the composition creates in the rodent a desire for water there is no danger of its death between partitions, etc.

I find that by working up this composition in the form of tablets having the shape or general outline of seeds, and particularly when having the shape or general outline of such flattened elliptical seeds as squash seeds, that it is eaten by rats with especial avidity and in the following claims I lay claim to a composition substantially of the character specified; that is, containing a heavy metallic oxid which is not highly poisonous to human beings, and formed into the shape of a seed.

Figure 2:

In the accompanying drawings, Figure 1 represents a plan view of the seed shaped composition; and Fig. 2 shows an end elevation of the same.

In the drawings, 1 represents the seed having a broadened base 2 and the narrow, restricted portion 3, the whole having the general outline of a squash seed.

The illustrations depict the composition in an enlarged form, and ordinarily I prefer to make these masses smaller than the size shown, but generally of the shape outlined therein. Of course the shape may be varied somewhat, but the drawings show substantially the shape which the manufactured articles have; a flattened elliptical form, resembling as near as may be that of such a seed as a squash seed, and, with the preferred composition stated, having also much the same hue and appearance.

In the formula above set forth it will be seen that I have combined a metallic oxid and a carbonate with binding and baiting material—the casein, sugar, etc. While I prefer to make use of barium in the form of a carbonate, or the oxid, it may also be used in other forms, as for instance the chlorid or acetate; similarly with the zinc material.

In general it is desirable to have the salts in a substantially insoluble condition so that when the composition is eaten no strong saline or metallic taste is detected. The binding and baiting material may be modified if desired and flour or oatmeal for instance may be substituted in part.

The corn meal and casein in the described embodiment have, however, the advantage that both being yellow, the composition as a whole has a yellowish color and when it is, as is preferable, formed into the shape of squash seeds, the likeness to squash seeds is thereby much enhanced. As stated, rats and mice have a particular fondness for squash seeds and the nearer the formed masses approach the general appearance of such squash seeds, the greater the avidity with which they consume the composition.

To recapitulate: My improved composition in its preferred form comprises a carbonate or oxid of a metal which has no violently toxic action on human beings, in combination with a binding and baiting material, the composition being cast or cut in the form of thin seed shaped masses. Preferably, as stated, these masses resemble as nearly as may be squash seeds in shape and general appearance.

It is, of course, to be understood that I may invoke the doctrine of chemical equivalency wherever the same may be herein applicable.

Having described my improved composition, to the details of which description I of course do not limit myself, what I claim as my invention and desire to secure by Letters Patent is:

1. A rat eradicator comprising barium carbonate, zinc oxid and casein.

2. A rat eradicator comprising barium carbonate, zinc oxid and a baiting material.

3. A rat eradicator comprising barium carbonate, and a finely divided proteid as binding material and a baiting material; said eradicator being in the form of small seed shaped masses.

4. A rat eradicator comprising barium carbonate and a baiting and a finely divided proteid binding material; said eradicator being in the form of small masses having the shape and general appearance of squash seeds.

5. A rat eradicator comprising barium carbonate and zinc oxid, the former being present in substantially twice the amount of the latter.

6. A rat eradicator comprising essentially barium carbonate and oxid of zinc in combination with baiting and binding material, the proportion of the barium compound being greater than that of the zinc compound; all incorporated to form seed-shaped masses.

7. A rat eradicator comprising barium carbonate and zinc oxid carried by binding and baiting material in the form and shape of a seed.

8. A rat eradicator comprising barium carbonate and yellowish binding and baiting materials in the form of small yellowish seed shaped masses, having substantially the general outline and appearance of a squash seed.

9. A rat eradicator comprising barium carbonate, another basic mineral body, a proteid binder and baiting material in the form of small masses having a flattened elliptical shape and general appearance of a natural seed.

10. A rat eradicator comprising barium carbonate and other basic mineral toxic material intimately admixed with binding and baiting material, the composition being formed into small masses having the general outline of seeds.

11. A rat eradicator comprising intimately admixed barium carbonate and casein.

12. A rat eradicator comprising intimately admixed barium carbonate and proteid and having the form of small flattened elliptical masses having the appearance of seeds.

In testimony whereof I have affixed my signature in presence of two witnesses.

CARLETON ELLIS.

Witnesses:
NATHANIEL L. FOSTER,
HENRIETTA BERKURTZ.